Oct. 21, 1924.

E. MACH 1,512,553

TIRE CARRIER

Filed May 7, 1923

Witnesses:

Inventor:
Edward Mach
By Joshua R. H. Potts
His Attorney

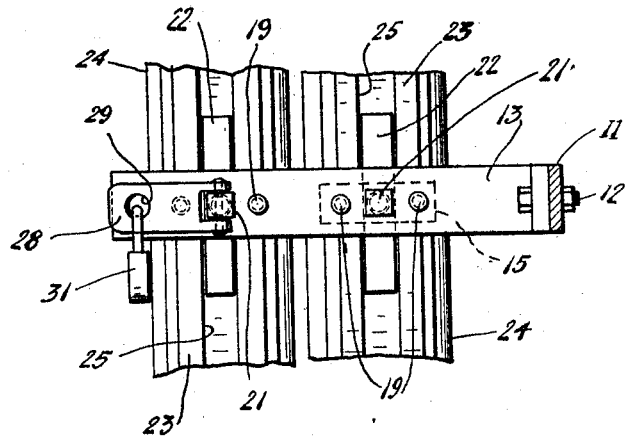
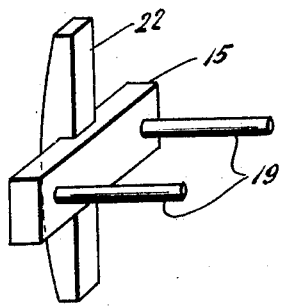
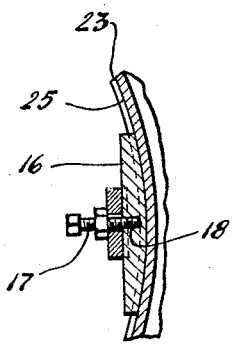
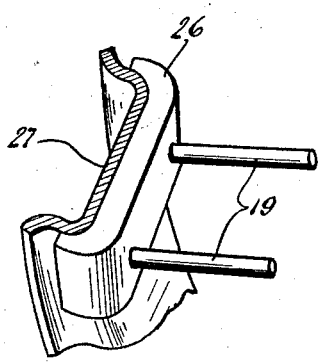

Patented Oct. 21, 1924.

1,512,553

UNITED STATES PATENT OFFICE.

EDWARD MACH, OF CHICAGO, ILLINOIS, ASSIGNOR OF ONE-HALF TO STEVENS B. FRANK, OF CHICAGO, ILLINOIS.

TIRE CARRIER.

Application filed May 7, 1923. Serial No. 637,067.

*To all whom it may concern:*

Be it known that I, EDWARD MACH, a citizen of the United States, and a resident of the city of Chicago, county of Cook, and State of Illinois, have invented certain new and useful Improvements in Tire Carriers, of which the following is a specification.

This invention relates to tire carriers, and more particularly to a combined tire and rim carrier and rim expander, and has for its object the provision of a device of this character having carrying elements which are adjustable to various positions so that a tire carrying rim may be held on the carrier, and if desired such carrying elements may be utilized to expand the rim when applying a tire thereto.

Another object of the invention is to provide means for locking the adjustable carrying elements in various positions to prevent surreptitious removal of the tires and rims from the carrier; and still another object is to arrange a plurality of tire carrying elements in such a manner so that it is only necessary to employ one locking means to prevent removal of any of a plurality of tire rims disposed on the tire carrier.

Other objects will appear hereinafter.

The invention consists in the combinations and arrangements of parts hereinafter described and claimed.

The invention will be best understood by reference to the accompanying drawings forming a part of this specification, and in which, Fig. 1, is a rear elevation of an automobile, showing the invention applied thereto;

Fig. 3, is a partial sectional view of the invention on the line 3—3 of Fig. 1;

Fig. 4, is a detail perspective view of a movable tire carrying element used in conjunction with the invention;

Fig. 5, is a sectional view on the line 5—5 of Fig. 2, and

Fig. 6, is a detail perspective view of a slightly modified form of the movable tire carrying element.

Figure 1:
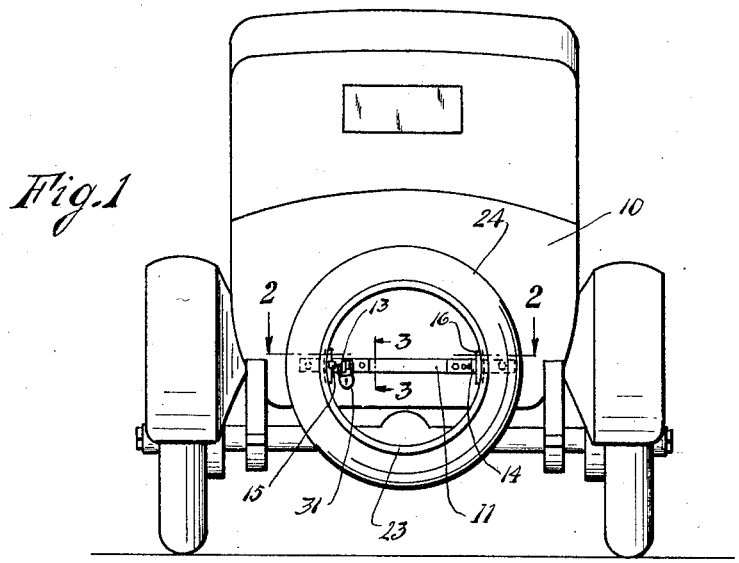
Figure 2:
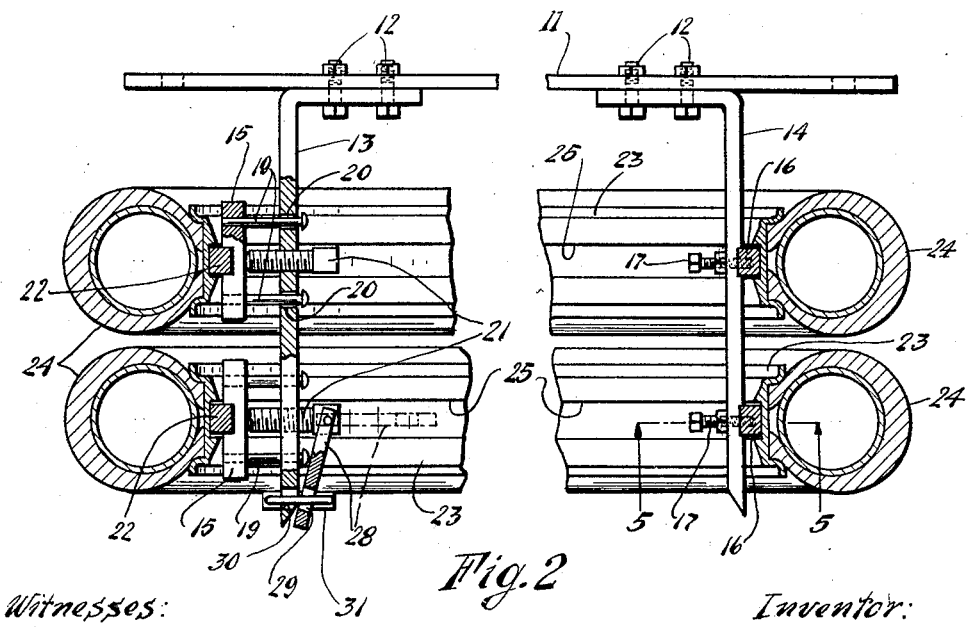
Fig. 2, is a view of the invention partly in section, on the line 2—2 of Fig. 1.

Referring to the drawings 10 represents the rear of an automobile, to which is secured by any suitable means a base member, preferably in the form of a bar 11. Mounted upon the bar 11, by means of bolts 12 are outwardly projecting supporting arms 13 and 14, which may be of any suitable length, depending upon the number of tires it is intended to place upon the carrier. Mounted upon the arm 13 are spaced tire and rim carrying elements 15, and mounted on the arm 14 opposite to the tire carrying elements 15, are spaced tire and rim carrying elements 16, each pair of opposite elements 15 and 16 forming a set for the accommodation of one tire and tire rim. The elements 16 are preferably rigidly secured to the arm 14 by any suitable means, a bolt 17 being tapped through the arm 14 and secured to the element 16 by any suitable means, threads 18 being shown in the drawings. The elements 15 are movably mounted, by means of pins 19 secured thereto, which extend through apertures 20 in the arm 13, and tapped through the arm 13 are screws 21, each of which is adapted to engage the under side of its related element 15, to hold the same in various adjusted positions. In Fig. 5 of the drawings, the elements 16 are shown as segmental portions, and the elements 15 are provided with similar portions 22, these portions being provided so as to fit a particular type of rim 23, carrying the tire 24, such rim having an inner circumferential groove 25, as shown.

Fig. 6, shows a modified form of segmental portions, such form comprising a trough shaped portion 26, the members 26 being used in place of the segmental portions of the carrying elements 15 and 16 when ordinary tire rims 27, not having grooves like 25 therein, are carried, the mounting of such members being the same as described for the segmental portions.

By this arrangement it will be apparent that the tire carrying rims 23 are secured in position on the carrier by engaging the segmental portions 16 and 22 with the groove in the member 23, and rotating the screws 21 to cause lateral spreading movement of the portion 22 into snug contact with the rim 23. It will also be noted that this expansion or spreading movement of the elements 15 is particularly adapted to expand the rim when applying a tire thereto.

Means are provided for locking the tire rims 23 upon the elements 15 and 16, and such means includes a lever 28 pivotally mounted upon the outer end of the outside screw 21, such lever having an aperture 29 in its end, adapted in one position to register with an aperture 30 in the end of the arm 13, such apertures being adapted to receive the hasp of a lock 31. By this arrangement it will be noticed that the lever 28 serves as a crank to turn the screw 21, and the pivotal mounting of such lever enables the same to be turned to locking position notwithstanding various positions of adjustment of the screw 21; and it will also be understood that locking of the lever 28 serves to lock all of the tire rims on the carrier, since it is impossible to remove the inside tire rim over the rim on the outer ends of the arms 13 and 14.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention what I claim as new and desire to secure by Letters Patent is:

1. A device of the character described including supporting arms; a plurality of sets of elements mounted on said arms, one of said elements being provided with guide pins slidably mounted in said arms; threaded means for moving said element; a lever mounted on said threaded means for moving the same to adjust said element; and means for locking said lever against its adjacent arm to hold said element in adjusted position.

2. A device of the character described including spaced rearwardly extending supporting arms; a plurality of sets of spaced elements mounted on said arms and adapted to receive tire carrying rims thereon, one of said elements being adjacent the outer ends of said arms and mounted for lateral movement with respect to the related tire carrying rim; pins fastened to said element and slidable through said arms for guiding said element laterally; a member threaded through said arms for moving said element outwardly; a lever on said member for operating the same; and locking means engaging in openings provided in said lever and its associated arm for locking said lever and arm together to hold said element in rim locking position.

In testimony whereof I have signed my name to this specification in the presence of two subscribing witnesses.

EDWARD MACH.

Witnesses:
 JOSHUA R. H. POTTS,
 FREDA C. APPLETON.